(12) United States Patent
Phillibert et al.

(10) Patent No.: US 12,506,776 B1
(45) Date of Patent: Dec. 23, 2025

(54) ROUTE HIJACK MITIGATION

(71) Applicant: Amazon Technologies, Inc., Seattle, WA (US)

(72) Inventors: Jonathan Phillibert, Seattle, WA (US); Kushal Mall, Issaquah, WA (US); Michael Marano, Federal Way, WA (US); Bobby Brown, Sydney (AU); Mario Souza, Dublin (IE); Eric Andrew Rubin-Smith, Fairfax, VA (US); Thomas Bradley Scholl, Seattle, WA (US); Michael W. Palladino, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 785 days.

(21) Appl. No.: 17/722,251

(22) Filed: Apr. 15, 2022

(51) Int. Cl.
*H04L 9/00* (2022.01)
*H04L 9/40* (2022.01)

(52) U.S. Cl.
CPC ...... *H04L 63/1483* (2013.01); *H04L 63/1416* (2013.01); *H04L 63/1425* (2013.01)

(58) Field of Classification Search
CPC .................. H04L 63/1483; H04L 63/1416
See application file for complete search history.

(56) References Cited

U.S. PATENT DOCUMENTS

| | | | |
|---|---|---|---|
| 8,141,156 B1* | 3/2012 | Mao ...................... | H04L 45/021 709/224 |
| 2010/0263041 A1* | 10/2010 | Shea ....................... | H04L 45/00 726/14 |
| 2016/0182561 A1* | 6/2016 | Reynolds, II ....... | H04L 41/0686 726/1 |
| 2019/0349396 A1* | 11/2019 | Compton ............ | H04L 63/1416 |
| 2021/0135982 A1* | 5/2021 | Chaturmohta ........... | H04L 45/28 |
| 2022/0224629 A1* | 7/2022 | Mada .................... | H04L 45/245 |
| 2022/0329621 A1* | 10/2022 | Heitz .................. | H04L 63/0823 |

\* cited by examiner

*Primary Examiner* — Christopher J Brown
(74) *Attorney, Agent, or Firm* — Klarquist Sparkman, LLP

(57) ABSTRACT

Technologies are disclosed for mitigating attempts to capture traffic on a network using unauthorized advertisements. Responsive to detecting an authorized advertisement for a path to a service on the network, a mitigation/orchestration service may determine a synthetic route advertisement that is configured to win back the captured traffic (e.g., by providing a route specificity that is at least equal to the unauthorized advertisement) and propagate the synthetic route advertisement from routers in the network. The won back traffic may be directed through a backbone of the network to the service.

18 Claims, 8 Drawing Sheets

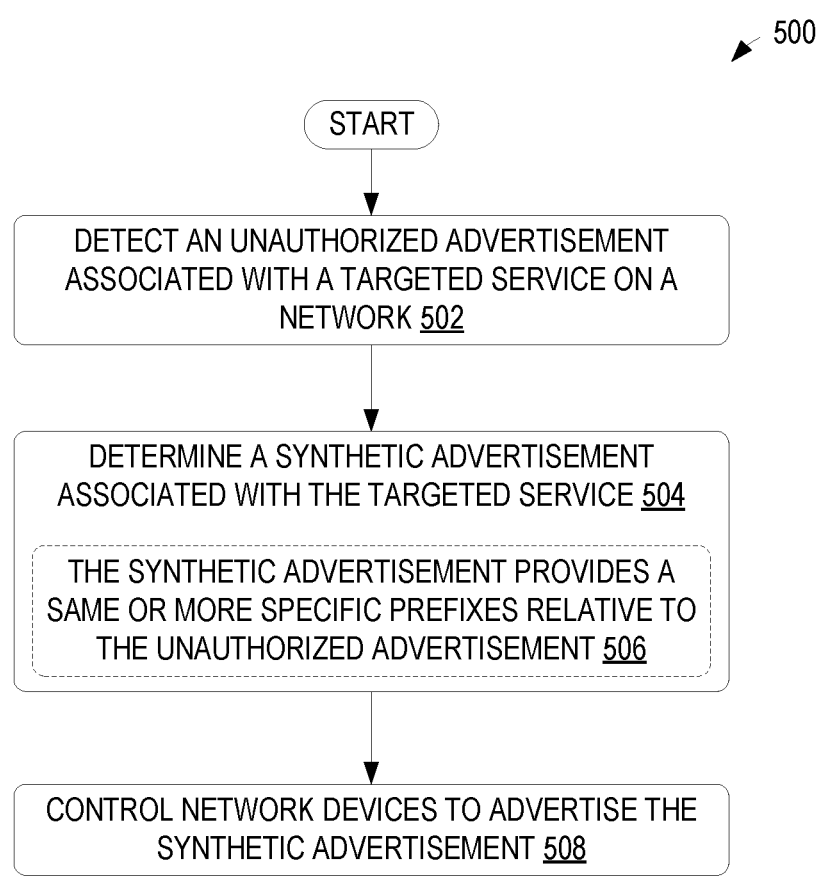

ROUTE HIJACK MITIGATION

BACKGROUND

Large computer networks, such as those used in cloud computing, may contain hundreds or thousands of components of several types, such as switches, routers, and hubs, which are interconnected with links. Generally, network routers receive packets on input ports and transmit the received packets to output ports based on a configuration of the network router. A forwarding table controls which next hops receive the packets. Typically, the forwarding table is programmed in accordance with routing strategies that control the propagation of data to a destination over a selected path or paths. The paths may be identified based on advertisements propagated by network devices, such as transit routers.

BRIEF DESCRIPTION OF THE DRAWINGS

FIG. 5 is a flow chart of an example method for mitigating unauthorized path advertisement injections into a network.

DETAILED DESCRIPTION

Modern high-scale global backbone networks may connect a data center or other service to other large networks in other areas (e.g., to other networks/devices distributed around the world). Advertisements, such as Border Gateway Protocol (BGP) advertisements, may be used by routers in a network to identify paths through the routers to other devices of the network, in order to propagate traffic through the network. In some instances, however, an unauthorized entity may attempt to capture or "hijack" traffic destined to a targeted endpoint and/or service on the network by propagating an advertisement for the targeted endpoint/service that redirects traffic to an external location (e.g., managed by the unauthorized entity). The present disclosure provides approaches to mitigate such unauthorized advertisements, which may relate to unauthorized attempts to perform a route hijack in a network, the presence of route leaks, and/or other unauthorized activity, by injecting synthetic route advertisements to the network configured to win back the traffic targeted by the unauthorized entity.

Figure 1:
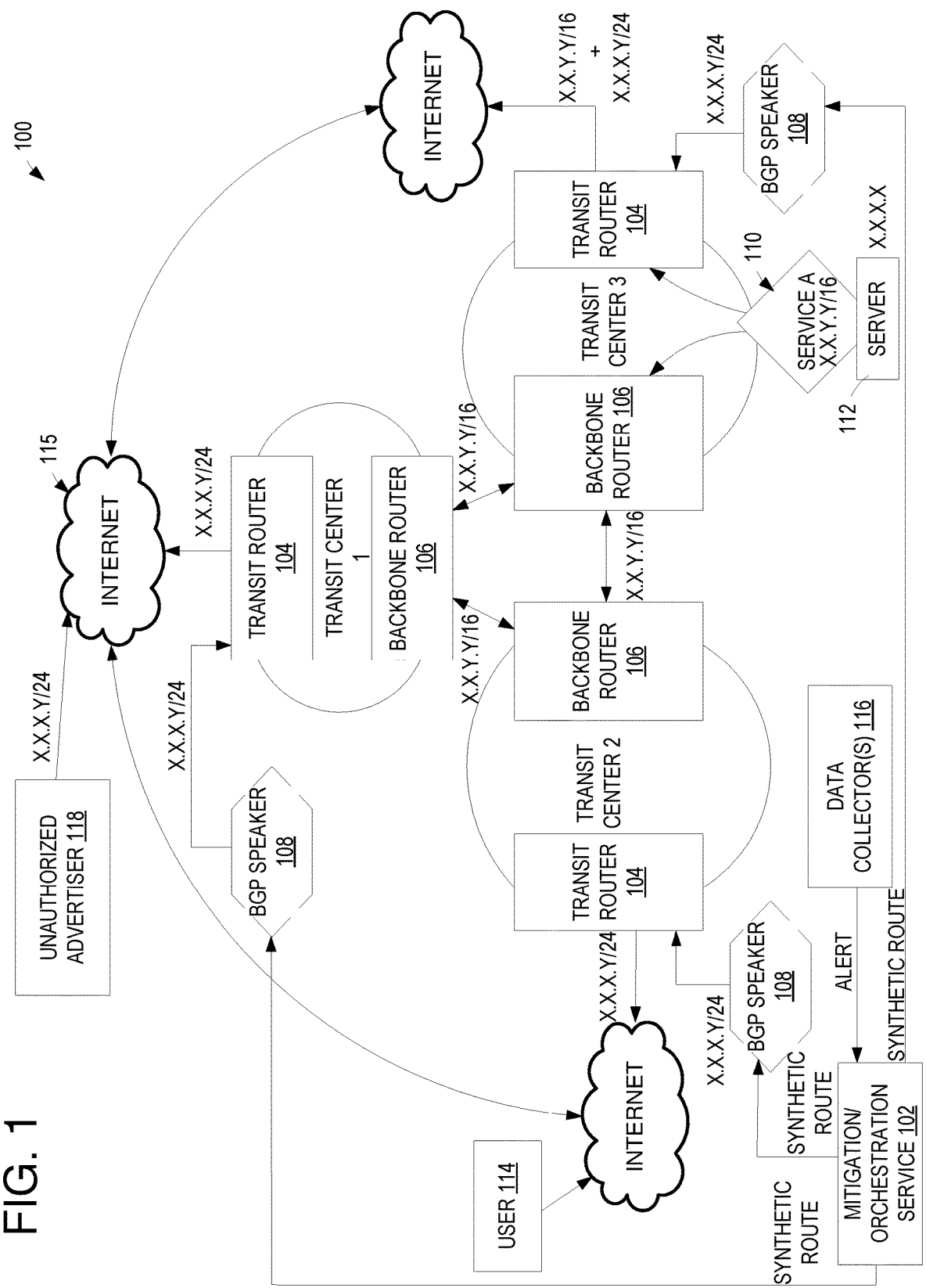
FIG. 1 shows an example system for detecting and mitigating unauthorized path advertisement injections into a network.

FIG. 1 shows an example route hijack mitigation system 100 that includes a network of devices connected to one another and to the Internet. The system 100 further includes a mitigation/orchestration service 102 configured to control advertisements, including controlling the propagation of synthetic advertisements when a route hijack attempt is detected, as described in more detail below. The network may be organized into multiple regions, illustrated in FIG. 1 as transit centers, each comprising at least one transit router 104 and at least one backbone router 106. The backbone routers 106 connect the transit routers 104 to one another via a backbone network. The transit routers 104 may each communicate with a respective Border Gateway Protocol (BGP) speaker 108, which controls the propagation of routing advertisements advertised by the transit routers. For example, each transit center may serve data for the services that are located adjacent to that transit center and announce routes to those services out to the Internet and across the backbone network. Each BGP speaker 108 can be implemented using one or more servers and/or network devices.

As an illustrative example, in FIG. 1, a service A 110 provided by and/or including server 112 is located adjacent to transit center 3 and thus in communication with the transit router 104 and backbone router 106 in transit center 3. Accordingly, under some operating conditions, the transit router 104 of transit center 3 and each of the backbone routers 106 may advertise a route to the service 110/server 112 (e.g., "X.X.Y.Y/16" in the illustrated example). During these conditions, the other transit routers in the other transit centers may not advertise routes to the service 110/server 112, as the service 110/server 112 is not in their respective region.

Accordingly, under some operating conditions, when a user 114 attempts to connect to service A 110, the connection may propagate over the Internet (represented at 115) to the transit router 104 that is in the same region as the service 110 (e.g., the transit router in transit center 3 in the illustrated example), due to the announcement of the route "X.X.Y.Y/16" advertised from the transit router out to the Internet. However, in some examples, an unauthorized advertiser, such as unauthorized advertiser 118, may attempt to capture traffic destined for the service A 110/server 112 by advertising a route that is favored to the route advertised by transit router 104 of transit center 3. For example, when routing communications across networks, network devices may select routes based on parameters of advertisements for the routes, including a specificity of the advertisement. Accordingly, an advertisement for a route to the service 110/server 112 that has a greater specificity (e.g., greater than the "/16" of the advertisement from the transit router) than the authorized advertiser may cause traffic targeting the service 110/server 112 to be misdirected to the unauthorized advertiser and/or a related network device. In this way, unauthorized entities may intercept traffic intended for the service 110/server 112, leading to disruptions in communications and compromised data.

The unauthorized advertisement may be detected by one or more data collectors 116 configured to monitor the network and identify unexpected advertisements (e.g., based on a comparison of detected advertisements to a list or other data structure identifying expected/authorized advertisements). The detection of the unauthorized advertisement from unauthorized advertiser 118 may be indicated to the mitigation/orchestration service 102 via an alert, which identifies parameters of the unauthorized advertisement, including a specificity of the unauthorized advertisement. The mitigation/orchestration service 102 may process the data from the data collectors 116 and determine a synthetic route advertisement configured to "win back" traffic (e.g., be treated as a favored route over the unauthorized advertisement and thus be selected for directing traffic to the targeted service/server). For example, the synthetic route advertisement may be configured to have at least the same or a greater specificity than the unauthorized advertisement. Additional details of the synthetic route advertisement determination will be described in more detail below with respect to FIG. 3.

The mitigation/orchestration service 102 may propagate an indication of the synthetic route advertisement to BGP speakers 108 of the network to control one or more transit routers to advertise the synthetic route advertisement. For example, the mitigation/orchestration service 102 may provide the synthetic route advertisement to each BGP speaker 108 of the network to control the transit routers 104 in each region to advertise the synthetic route advertisement. Since the transit router 104 of transit center 3 was already advertising a route to the service 110/server 112 (e.g., the /16 advertisement), the synthetic advertisement may be advertised in addition to the original advertisement. In the illustrated example, the synthetic route advertisement is represented by "X.X.X.Y/24" and thus matches the specificity of the unauthorized advertisement. However, since other parameters of the advertisement, such as the number of hops in the route, are likely to be favored over those of the unauthorized advertiser (e.g., due to the larger number of devices and greater presence of the network compared to the unauthorized advertiser), traffic targeting the service 110/server 112 may be "won back" by being routed from the Internet to a transit router 104 on the network rather than to the unauthorized advertiser.

The synthetic advertisement may identify a backbone router 106 as the next hop, such that any transit router 104 that receives traffic based on the synthetic advertisement is configured to direct traffic to the backbone network to reach the targeted destination (e.g., the service 110/server 112 via the network devices of transit center 3). For example, in the illustrated example, the traffic from user 114 may be directed from the internet to the transit router 104 of transit center 2 based on the synthetic advertisement, then directed to the backbone router 106 of transit center 2, then directed to the backbone router 106 of transit center 3 and finally to service 110/server 112 (e.g., directly or via the transit router 104 of transit center 3).

Figure 2:
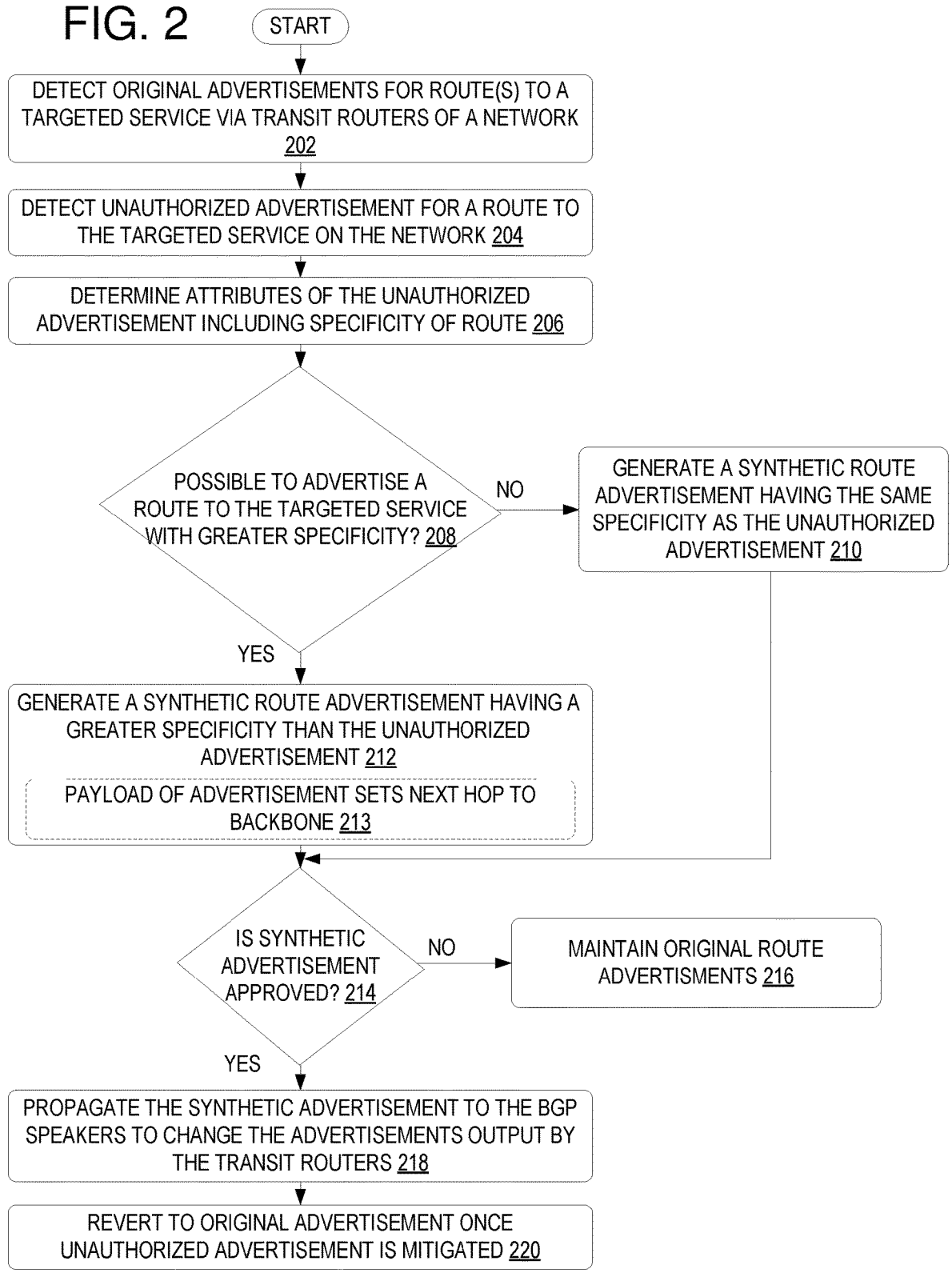
FIG. 2 is a flow chart of an example method for detecting and mitigating unauthorized path advertisement injections into a network by generating synthetic advertisements to recapture traffic away from the unauthorized path.

FIG. 2 is a flow chart of an example method 200 for detecting and mitigating unauthorized path advertisement injections into a network by generating synthetic advertisements to recapture traffic away from the unauthorized path. For example, method 200 may be performed by the mitigation/orchestration service 102 of FIG. 1 in coordination with the network devices shown in FIG. 1. At 202, the method includes detecting original advertisements for route(s) to a targeted service via transit routers of a network. For example, the original route advertisement may have a first specificity, such as the "/16" advertisement described above with respect to the illustrative example of FIG. 1. The original advertisements may represent an initial state of the transit routers prior to any detection of unauthorized activity on the network.

At 204, the method includes detecting an unauthorized advertisement for a route to the targeted service on the network. For example, the detection may be performed by one or more network monitoring services, configured to collect data including advertisements propagated on the network. The determination of an advertisement as being unauthorized may be made by comparing detected advertisements to a list or other data structure that identifies expected advertisements for the network. In other examples, the advertisement may be deemed to be unauthorized based on a source of the advertisement (e.g., if the advertisement is for a service or endpoint on the network and is advertised by a device that is not controlled by an administrative entity of the network).

At 206, the method includes determining attributes of the unauthorized advertisement including specificity of the route being advertised. At 208, the method includes determining whether it is possible to advertise a route to the targeted service with a greater specificity than that of the unauthorized advertisement. For example, the prefix of the unauthorized advertisement may be compared to a threshold route specificity/prefix to determine if a greater specificity is allowed to be used. Using the illustrative example of FIG. 1, the "/24" may be evaluated to determine if a greater specificity (e.g., greater than /24) can be advertised. If it is not possible to advertise at a greater specificity (e.g., "NO" at 208), the method includes generating a synthetic advertisement having a same specificity as the unauthorized advertisement, as indicated at 210. If it is possible to advertise at a greater specificity (e.g., "YES" at 208), the method includes generating a synthetic route advertisement having a greater specificity than the unauthorized advertisement, as indicated at 212. For example, if the unauthorized advertisement has a /22 prefix and the threshold specificity is /24, then the method would include generating a synthetic route advertisement having a specificity of /23 or /24.

As indicated at 213, the payload of the advertisement indication may set the next hop to the backbone of the network in order to control won-back traffic to flow over the backbone to the destination (e.g., the targeted service). For example, each transit router may have static routes configured thereon, a first of which points to an address that is unique to the region's backbone routers, and a second of which tells the device to set a next hop to a selected next hop's next hop. In other words, a first static route may designate that traffic to X.0.2.1/32 is to be sent to Y.Y.Y.Y, and a second static route may designate that traffic to X.0.2.2/32 is to be sent to a next hop of X.0.2.1/32 (e.g., Y.Y.Y.Y). Accordingly, the synthetic advertisement may designate the static route (e.g., X.0.2.2/32 in the illustrated example) as a next hop in order to ensure that traffic directed to the transit router due to the synthetic advertisement is resolved to a local backbone router that can then propagate the traffic along the backbone network to the target destination. The above-described approach may save resources by preventing the orchestration service from maintaining a database of next hops for each transit router, since a generic next hop can still be resolved to a local backbone router for each transit router. It is to be understood that other examples of designating a next hop that directs traffic received based on the synthetic advertisement to a backbone network may be performed without departing from the scope of the disclosure. Additionally or alternatively, in some examples, transit routers may have one static route configured thereon, which is used as described above to designate a next hop as a backbone router.

At 214, the method includes determining if the synthetic advertisement is approved to be used. For example, the synthetic advertisement may not be approved if it would violate a rule, such as a maximum number of prefix advertisements. If the synthetic advertisement is not approved (e.g., "NO" at 214), the method includes maintaining the original route advertisements, as indicated at 216. If the synthetic advertisement is approved (e.g., "YES" at 214), the method includes propagating the synthetic route advertisement to the BGP speakers to change the advertisements output by the transit routers, as indicated at 218. For example, changing the advertisements may include advertising the route with transit routers that were not previously advertising any route to the service and, in some examples, adding the synthetic route advertisement to the original advertisement(s) to the service for transit routers that were previously advertising the original advertisements(s). As indicated at 220, the method may further include a process to withdraw the synthetic advertisement, such as reverting to the original advertisement once the unauthorized advertisement is determined to be mitigated (e.g., the ability of the unauthorized entity to advertise is negated, a threshold time has passed, etc.). For example, the withdrawal of the synthetic advertisement may include controlling network devices that were not previously (e.g., before the detection of the unauthorized advertisement) advertising a route to the service to revert to no longer advertise a route to the service, and may include controlling network devices that were previously advertising a route to the service to return to advertising only the original advertisement(s) with the lower specificity (e.g., and no longer advertising the synthetic advertisement).

Figure 3:
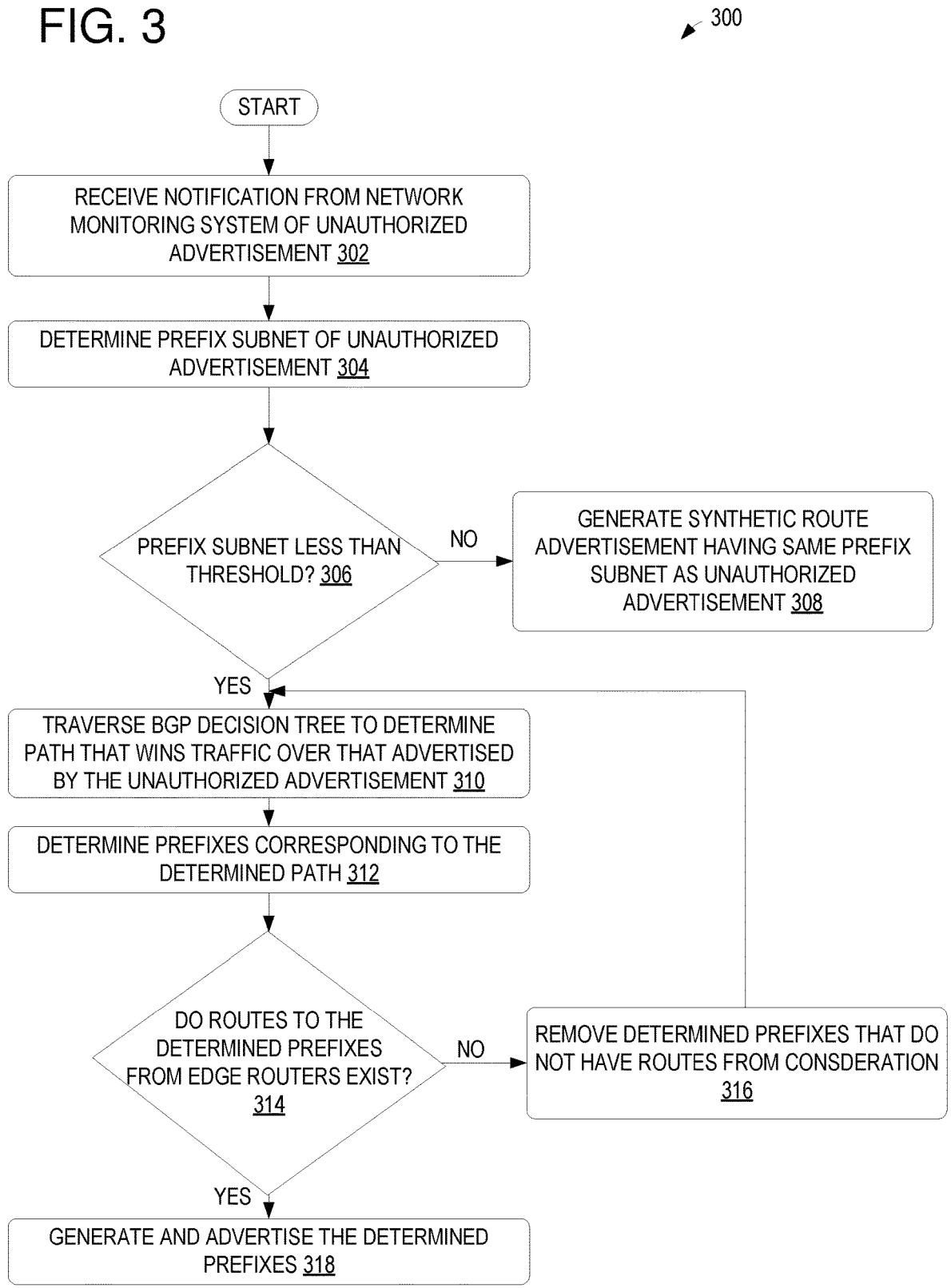
FIG. 3 shows a flow chart of an example method for determining synthetic advertisements responsive to detecting an unauthorized advertisement in a network.

FIG. 3 shows an example method 300 for determining a synthetic route advertisement responsive to detecting an unauthorized attempt to capture traffic in a network. For example, method 300 may be performed by an orchestration service, such as mitigation/orchestration service 102 of FIG. 1. At 302, the method includes receiving a notification from a network monitoring system indicating an unauthorized advertisement. Examples of the detection of an unauthorized advertisement described above may be used to generate the notification received at 302. For example, an analysis of data collected from the network may include comparing prefix announcements and autonomous system path changes to a database of prefixes owned by a management entity associated with the network to determine mismatches and/or any changes that fall outside expected patterns (e.g., prefixes that are not visible to major networks or that are announced by autonomous systems or other devices that are not managed by the management entity of the network).

At 304, the method includes determining a prefix subnet (e.g., determining a mask of the prefix) of the unauthorized advertisement. At 306, the prefix subnet is compared to a threshold (e.g., "/24") to determine if the prefix subnet of the unauthorized advertisement is less than the threshold. If the prefix subnet is not less than the threshold (e.g., "NO" at 306), the method includes generating a synthetic route advertisement having the same prefix subnet as the unauthorized advertisement, as indicated at 308. If the prefix subnet is less than the threshold (e.g., "YES" at 306), the method includes traversing a Border Gateway Protocol (BGP) decision tree to determine a path that wins traffic over the unauthorized advertisement, as indicated at 310 and determine prefixes corresponding to the determined path, as indicated at 312.

At 314, the method includes determining if there exist routes to the determined prefixes from the edge routers of the network. If there are no routes to the determined prefixes from edge routers (e.g., "NO" at 314), the method includes removing the determined prefixes that do not have routes from consideration in the BGP decision tree traversal, and returning to 310 to re-run the traversal of the BGP decision tree to determine a next best set of prefixes for a next best route that wins traffic over the unauthorized advertisement, as indicated at 316. If there are routes from edge routers to the determined prefixes (e.g., "YES" at 314), the method includes generating and advertising the determined prefixes as a synthetic advertisement, as indicated at 318. In some examples, after advertising the synthetic advertisement, a check is performed to ensure that the synthetic advertisements are visible on the Internet.

In some examples, when determining prefixes for winning back traffic, it may be determined that a network space is to be broken up into two more specific parts that are advertised via the synthetic advertisement. The following provides a description of one illustrative example of such an operation. As described above, a prefix includes an address (e.g., X.Y.X.0 as an illustrative example) in addition to a mask (e.g., /16 as an illustrative example). The mask indicates how many digits of the address are significant. For example, the prefix X.Y.X.0/16 references a network address, where a targeted child network is defined by the 16 leftmost bits of the binary representation of the address. Since each significant bit can have two values (e.g., 0 and 1), representing two sub-networks in this example, increasing a specificity of a prefix (e.g., increasing the mask from 16 to 17) includes generating two prefixes—one in which the last significant bit is set to a value of 1 and one in which the last significant bit is set to a value of 0. As an illustrative example, a network address of 130.255.130.0 with a /16 mask can be represented as:

10000010.11111111.10000010.00000000 (address (130.255.130.0))
11111111.11111111.00000000.00000000 (subnet mask (16))
resulting in:
11111111.11111111.00000000.00000000 (network (130.255.0.0/16))

In order to win back traffic with a more specific mask of 17, two prefixes may be advertised, namely:

10000010.11111111.00000000.00000000 (network, 130.255.0.0)
11111111.11111111.10000000.00000000 (mask, /17)
and
10000010.11111111.10000000.00000000 (network, 130.255.128.0)
11111111.11111111.10000000.00000000 (mask /17).

Figure 4A:
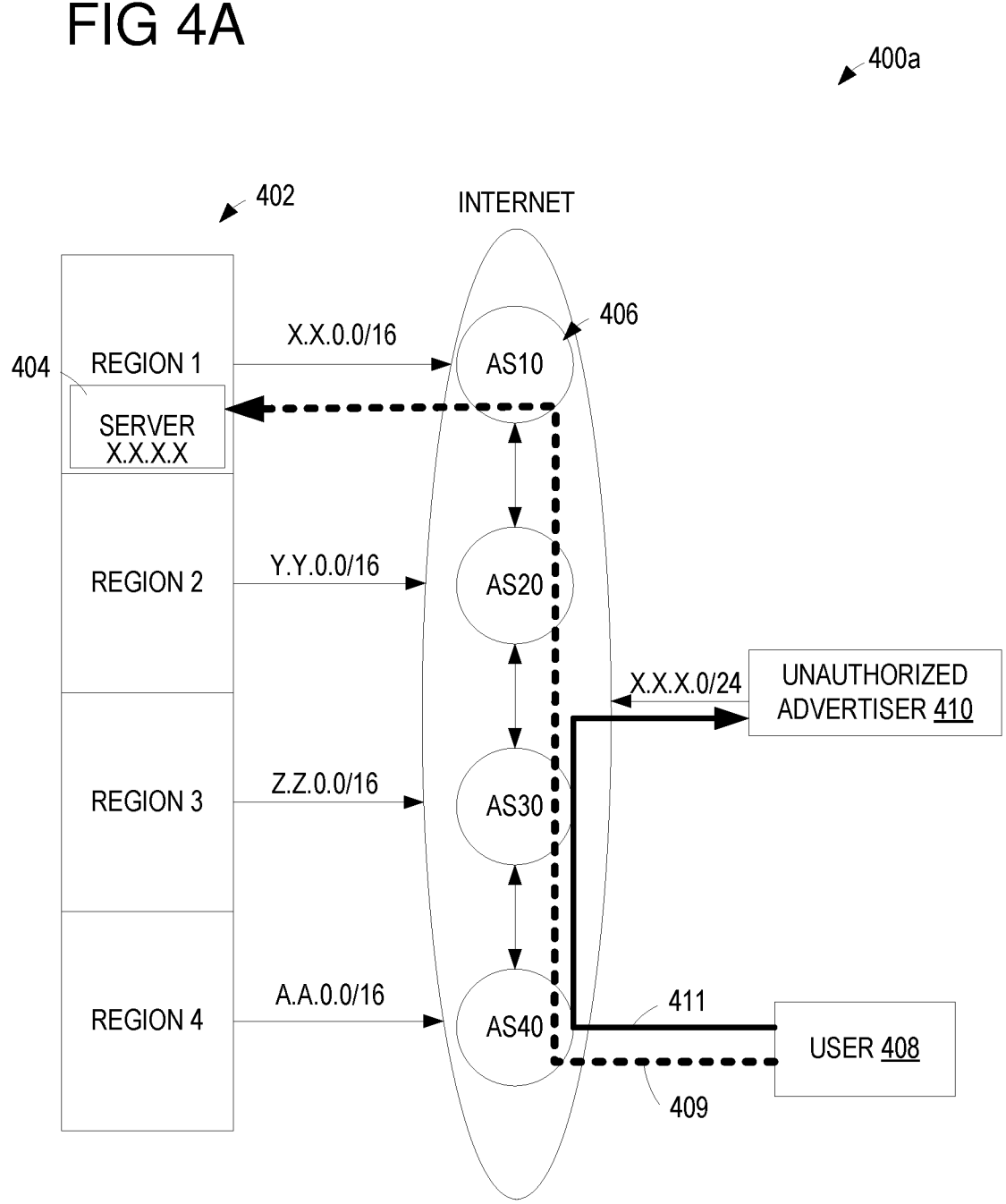
FIGS. 4A and 4B schematically show example traffic flow before and after mitigating an unauthorized path advertisement in a network.
Figure 4B:
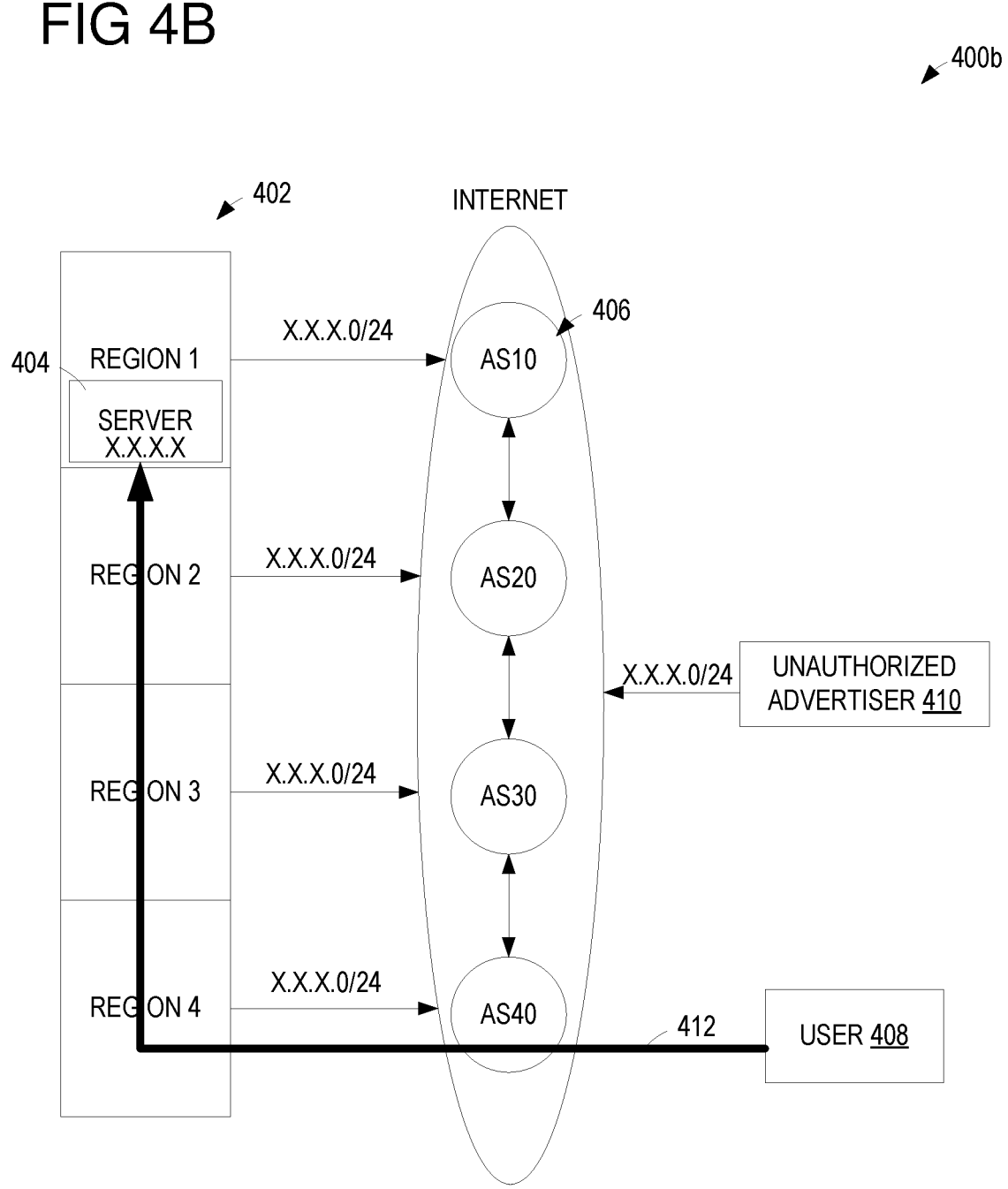

FIG. 4A schematically shows an example flow of traffic that is rerouted to an unauthorized entity providing an unauthorized route advertisement and FIG. 4B schematically shows an example flow of traffic that is redirected away from the unauthorized entity based on the injection of synthetic route advertisements in the network (e.g., determined as described above with respect to method 200 of FIG. 2 and method 300 of FIG. 3). Turning first to FIG. 4A, a network system 400a includes a network 402 organized into a plurality of regions (e.g., regions 1-4), each region including associated network devices and/or services for that region. For example, region 1 includes a server 404 at representative address "X.X.X.X." Network device(s) of region 1 may correspondingly advertise routes to the services of that region, including the illustrated example advertisement for server 404 shown as "X.X.0.0/16, to the Internet (e.g., to an associated autonomous system (AS) 406, such as AS10). The remaining regions may advertise routes to their respective services, represented by the advertisements "Y.Y.0.0/16," etc. Accordingly, under operating conditions where an unauthorized advertiser is not present, the traffic from a user 408 targeting server 404 may be directed as shown by the dashed line 409.

However, if an unauthorized advertiser 410 propagates an advertisement to the server 404 to the Internet having a greater specificity (e.g., represented in the illustrated example as the advertisement "X.X.X.0/24"), the traffic from user 408 is rerouted to the unauthorized advertiser, as represented by the solid line 411.

Turning now to FIG. 4B, a network system 400b includes the same configuration as system 400a, only now all regions are controlled to advertise a synthetic advertisement for server 404 which has at least a same specificity as the advertisement from unauthorized advertiser 410 (e.g., in the illustrated example, the synthetic advertisement is the same specificity, "X.X.X.0/24"). Accordingly, the traffic from user 408 targeting server 404 is "won back" by the network 402 as it is redirected away from the unauthorized advertiser 410 as shown by solid like 412. For example, since region 4, a closest region to the user 408, is advertising the route to server 404 via the synthetic advertisement, the traffic exits the Internet and enters the network 402 at region 4, and is then propagated to region 1 via a backbone of network 402 (e.g., in a similar manner as shown and described above with respect to FIG. 1 and backbone routers 106).

FIG. 5 is a flow chart of an example method 500 for mitigating unauthorized route advertisements in a network. For example, method 500 may be performed by the mitigation/orchestration service of FIG. 1. At 502, the method includes detecting an unauthorized advertisement associated with a targeted service on a network. For example, as described above with respect to method 200 of FIG. 2, the detection may be performed by one or more network monitoring services, configured to collect data including advertisements propagated on the network and compare collected data to expected advertisements for the network.

At 504, the method includes determining a synthetic advertisement associated with the targeted service. For example, as described above, the synthetic advertisement may be configured to win back traffic to the targeted service based on parameters of the unauthorized advertisement. As indicated at 506, the synthetic advertisement provides a same or more specific prefixes relative to the unauthorized advertisement. For example, the synthetic advertisement may be generated as described above with respect to FIG. 3. At 508, the method includes controlling network devices to advertise the synthetic advertisement. For example, all network devices and/or network devices in all regions of the network may be controlled to advertise the synthetic advertisement in order to recapture the traffic as close to the origin of the traffic as possible.

Figure 6:
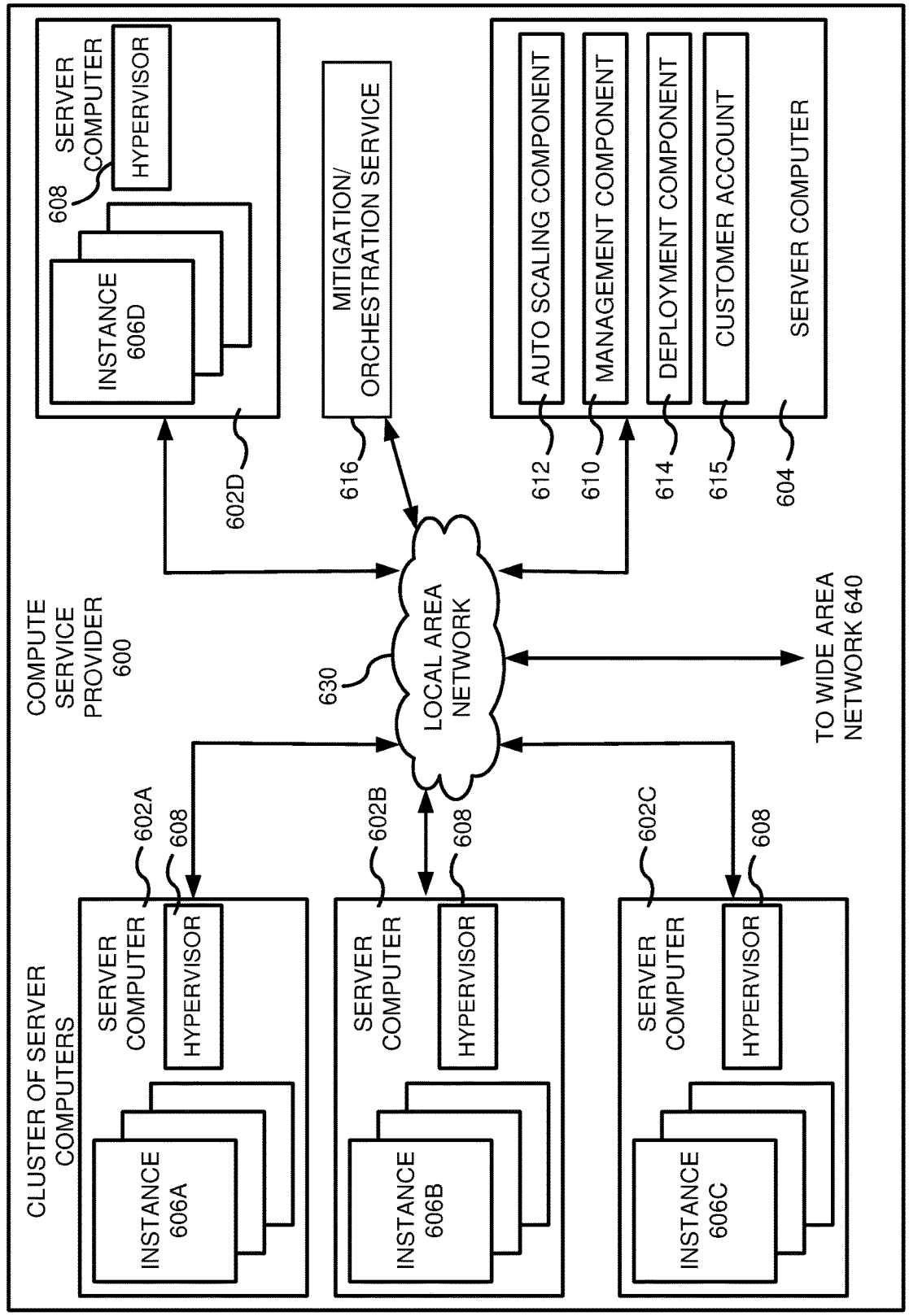
FIG. 6 is an example system diagram showing a plurality of virtual machine instances running in the multi-tenant environment.

FIG. 6 is a computing system diagram of a network-based compute service provider 600 that illustrates one environment in which embodiments described herein can be used. By way of background, the compute service provider 600 (i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of users operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

In some implementations of the disclosed technology, the computer service provider 600 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their users or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users can connect to availability zones of the cloud provider network via a publicly accessible network (e.g., the Internet, a cellular communication network) by way of a transit center (TC). TCs are the primary backbone locations linking users to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example of virtual machine, each of the servers 602A-602D can be configured to execute a hypervisor 608 or another type of program configured to enable the execution of multiple instances 606 on a single server. Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A user can access the management component 610 to configure various aspects of the operation of the instances 606 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 612 can scale the instances 606 based upon rules defined by the user. In one embodiment, the auto scaling component 612 allows a user to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist users in the deployment of new instances 606 of computing resources. The deployment component can have access to account information associated with the instances, such as who is the owner of the account, credit card information, country of the owner, etc. The deployment component 614 can receive a configuration from a user that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the user-provided configuration and cache logic to configure, prime, and launch new instances 606. The configuration, cache logic, and other information may be specified by a user using the management component 610 or by providing this information directly to the deployment component 614. The instance manager can be considered part of the deployment component.

User account information 615 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc. Mitigation/orchestration service 616 may be an example of mitigation/orchestration service 102 of FIG. 1 and may be configured to collect data relating to the network 630 and determine/control synthetic advertisements to be injected into the network responsive to detecting an attempt by an unauthorized entity to capture traffic from the network.

A network 630 can be utilized to interconnect the server computers 602A-602D and the server computer 604. The network 630 can be a local area network (LAN) and can be connected to a Wide Area Network (WAN) 640 so that end users can access the compute service provider 600. It should be appreciated that the network topology illustrated in FIG. 6 has been simplified and that many more networks and networking devices can be utilized to interconnect the various computing systems disclosed herein.

Figure 7:
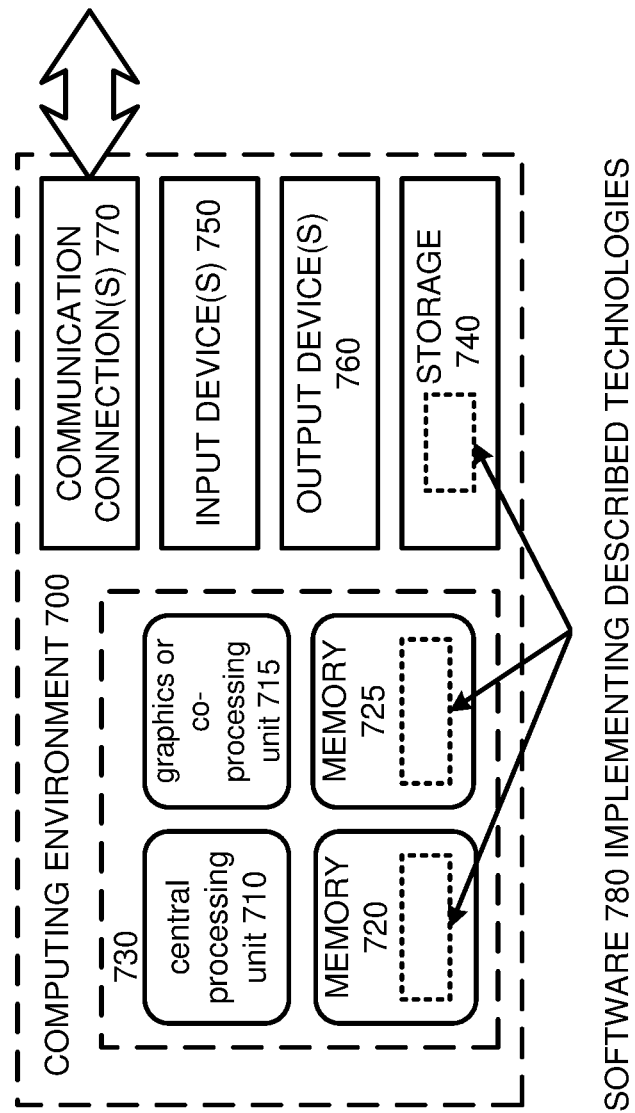
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.). In some examples, the computing environment 700 may include and/or be included in any of the network or other devices described herein, such as mitigation/orchestration service 102, the transit routers 104, the backbone routers 106, a client device used by the user 114, the data collectors 116, the unauthorized advertiser 118, and/or other components of FIGS. 1 and 4A/4B. In additional or alternative examples, the methods of FIGS. 2, 3, and 5 may be performed by one or more computing systems including or included in a computing environment such as computing environment 700.

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computer network comprising:
  a plurality of transit routers configured to direct traffic to services in the network, the plurality of transit routers including a first transit router communicatively connected to a targeted service and configured to initially propagate an original advertisement for the targeted service having a first route specificity;
  a plurality of backbone routers connected to the plurality of transit routers and configured to propagate the original advertisement for the targeted service; and
  a computing system providing an orchestration service, the computing system including one or more processors and a memory storing instructions executable by the one or more processors to perform a method comprising:
    detecting an unauthorized advertisement associated with the targeted service on the network, the unauthorized advertisement having a second route specificity that is greater than the first route specificity of the original advertisement for the targeted service;
    determining a synthetic advertisement configured to have a third route specificity that is at least the same as the second route specificity of the unauthorized advertisement; and
    sending an indication of the synthetic advertisement to a plurality of respective Border Gateway Protocol (BGP) speakers in communication with the plurality of transit routers to control the plurality of transit routers to advertise the synthetic advertisement, the indication further indicating at least one of the plurality of backbone routers as a next hop for traffic directed to the targeted service, wherein the plurality of backbone routers are configured to maintain propagating the original advertisement while the plurality of transit routers advertise the synthetic advertisement.

2. The computer network of claim 1, wherein the third route specificity of the synthetic advertisement is greater than the second route specificity of the unauthorized advertisement.

3. The computer network of claim 1, further comprising one or more data collectors connected to the computing system providing the orchestration service, the one or more data collectors configured to gather real-time network information, wherein detecting the unauthorized advertisement comprises determining that the real-time network information indicates the unauthorized advertisement based on an alert received from the data collectors.

4. The computer network of claim 3, wherein the second route specificity of the unauthorized advertisement is included in the real-time network information gathered by the one or more data collectors.

5. The computer network of claim 1, wherein the method further comprises controlling the plurality of transit routers to maintain propagating the original advertisement responsive to determining that the synthetic advertisement violates one or more rules.

6. A method comprising:
  detecting, with a network orchestrator service, an unauthorized advertisement for a first route associated with a targeted service on a network;
  determining, with the network orchestrator service, a synthetic advertisement of a second route associated with the targeted service to win back traffic from the unauthorized advertisement, the synthetic advertisement providing a same or more specific prefix relative to the unauthorized advertisement; and
  controlling a network device in the network to advertise the synthetic advertisement of the second route, wherein the network comprises a plurality of transit routers connected to a backbone comprising a plurality of backbone routers, and wherein controlling the network device to advertise the synthetic advertisement comprises controlling one or more of the plurality of transit routers to advertise the synthetic advertisement while the plurality of backbone routers maintain an original advertisement associated with the targeted service.

7. The method of claim 6, wherein controlling the network device to advertise the synthetic advertisement includes controlling each of the plurality of transit routers to advertise the synthetic advertisement, wherein the plurality of transit routers are located in different regions of the network from one another.

8. The method of claim 7, wherein at least one of the plurality of transit routers is located in a different region of the network from the targeted service.

9. The method of claim 6, wherein controlling the network device to advertise the synthetic advertisement includes outputting an indication of the synthetic advertisement to a Border Gateway Protocol (BGP) speaker in communication with the network device.

10. The method of claim 9, wherein the indication of the synthetic advertisement includes a designation of at least one of the plurality of backbone routers as a next hop for traffic directed to the targeted service.

11. The method of claim 6, wherein determining the synthetic advertisement comprises comparing a prefix subnet of the unauthorized advertisement to a threshold and, responsive to determining that the prefix subnet is equal to the threshold, generating the synthetic advertisement with a prefix subnet that is equal to the prefix subnet of the unauthorized advertisement.

12. The method of claim 11, wherein determining the synthetic advertisement further comprises, responsive to determining that the prefix subnet is less than the threshold, traversing a Border Gateway Protocol (BGP) decision tree to determine a path that wins traffic over the unauthorized advertisement and generating the synthetic advertisement to include prefixes corresponding to the determined path.

13. A computing system providing an orchestration service for a network, the computing system comprising:
 one or more processors; and
 a memory storing instructions executable by the one or more processors to:
  detect a presence of an unauthorized advertisement associated with a targeted service on the network;
  determine, based on attributes of the unauthorized advertisement, a synthetic advertisement associated with the targeted service configured to redirect traffic away from an endpoint associated with the unauthorized advertisement, the synthetic advertisement having at least a same route specificity as the unauthorized advertisement; and
  control a plurality of routers in a plurality of regions of the network to advertise the synthetic advertisement to recapture traffic directed to the targeted service while a plurality of backbone routers in the network maintain an original advertisement associated with the target service.

14. The computing system of claim 13, wherein controlling the plurality of routers to advertise the synthetic advertisement includes sending an indication of the synthetic advertisement to respective Border Gateway Protocol (BGP) speakers associated with the plurality of routers.

15. The computing system of claim 14, wherein the indication is transmitted as a data packet having a payload that specifies a backbone of the network as a next hop for traffic routed according to the synthetic advertisement in order to control the recaptured traffic to flow through the backbone of the network to the targeted service.

16. The computing system of claim 13, wherein the unauthorized advertisement has a first route specificity, and wherein determining the synthetic advertisement comprises comparing the first route specificity to a threshold route specificity and designating a second route specificity for the synthetic advertisement to be,
 greater than the first route specificity if the first route specificity is less than the threshold route specificity, or
 equal to the first route specificity if the first route specificity is equal to the threshold route specificity.

17. The computing system of claim 16, wherein the second route specificity is determined based on a traversal of a Border Gateway Protocol (BGP) decision tree to determine a path that wins traffic over the unauthorized advertisement.

18. The computing system of claim 17, wherein the second route specificity is used for the synthetic advertisement responsive to determining that routes exist to prefixes having the second route specificity from edge routers.

\* \* \* \* \*